United States Patent
Lee et al.

(10) Patent No.: US 11,021,152 B2
(45) Date of Patent: Jun. 1, 2021

(54) DRIVING SYSTEM FOR ELECTRIC VEHICLE AND CONTROL METHOD THEREOF

(71) Applicants: Hyundai Motor Company, Seoul (KR); Kia Motors Corporation, Seoul (KR)

(72) Inventors: Jae Joon Lee, Anyang-si (KR); Hyun Noh Kim, Hwaseong-si (KR); Jin Ho Kim, Suwon-si (KR); Jong Sool Park, Seongnam-si (KR); Kyeong Hun Lee, Seoul (KR); Bong Guy Son, Gunpo-si (KR); Jong Sung Kim, Incheon (KR); Jin Young Hwang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 16/363,579

(22) Filed: Mar. 25, 2019

(65) Prior Publication Data
US 2020/0101972 A1    Apr. 2, 2020

(30) Foreign Application Priority Data

Oct. 1, 2018 (KR) .................. 10-2018-0116991

(51) Int. Cl.
*B60W 30/18* (2012.01)
*B60K 17/06* (2006.01)
(Continued)

(52) U.S. Cl.
CPC ....... *B60W 30/18063* (2013.01); *B60K 17/02* (2013.01); *B60K 17/06* (2013.01);
(Continued)

(58) Field of Classification Search
CPC combination set(s) only.
See application file for complete search history.

(56) References Cited

U.S. PATENT DOCUMENTS

2002/0177500 A1* 11/2002 Bowen ............... B60K 6/48
475/5
2008/0093137 A1* 4/2008 Maeda ............... B60W 10/02
180/65.265

(Continued)

FOREIGN PATENT DOCUMENTS

KR    10-2009-0132758 A    12/2009

*Primary Examiner* — Marthe Y Marc-Coleman
(74) *Attorney, Agent, or Firm* — Morgan, Lewis & Bockius LLP

(57) ABSTRACT

A driving system for an electric vehicle may include a shift assembly receiving power from a motor, and providing a plurality of shift gears using a plurality of meshed external gear pairs, a clutch intermittently transferring power from the motor to the shift assembly, a gear lever allowing a driver to sequentially select a plurality of assigned positions that are discontinuously disposed, a position sensor detecting the assigned positions to which the gear lever sequentially moves, on the basis of continuous changes in physical quantities, a clutch actuator actuating the clutch, a shift actuator actuating the shift assembly to change gear shifts, and a controller configured for controlling the clutch actuator, the shift actuator, and the motor to change gear shifts by receiving signals from the position sensor.

15 Claims, 4 Drawing Sheets

(51) Int. Cl.

| | |
|---|---|
| *B60K 20/02* | (2006.01) |
| *B60K 23/02* | (2006.01) |
| *B60W 10/08* | (2006.01) |
| *B60W 10/02* | (2006.01) |
| *B60L 15/20* | (2006.01) |
| *F16H 59/04* | (2006.01) |
| *B60K 17/02* | (2006.01) |

(52) U.S. Cl.
CPC .............. *B60K 20/02* (2013.01); *B60K 23/02* (2013.01); *B60L 15/20* (2013.01); *B60L 15/2063* (2013.01); *B60W 10/02* (2013.01); *B60W 10/08* (2013.01); *F16H 59/044* (2013.01); *B60L 2240/486* (2013.01); *B60L 2240/642* (2013.01); *B60L 2250/26* (2013.01); *B60W 2510/1005* (2013.01); *B60W 2540/10* (2013.01); *B60W 2552/15* (2020.02); *B60W 2710/022* (2013.01); *B60W 2710/083* (2013.01); *B60Y 2200/91* (2013.01); *B60Y 2300/18058* (2013.01)

(56) References Cited

U.S. PATENT DOCUMENTS

2011/0040461 A1\* 2/2011 Wolterman ........... B60W 10/02
701/51
2015/0344020 A1\* 12/2015 Kato ..................... B60K 6/365
701/22

\* cited by examiner

DRIVING SYSTEM FOR ELECTRIC VEHICLE AND CONTROL METHOD THEREOF

CROSS REFERENCE TO RELATED APPLICATION

The present application claims priority to Korean Patent Application No. 10-2018-0116991, filed Oct. 1, 2018, the entire contents of which is incorporated herein for all purposes by this reference.

BACKGROUND OF THE INVENTION

Field of the Invention

The present invention generally relates to a driving system for an electric vehicle and a control method thereof and, more particularly, to a driving system propelled by power of a motor and including a plurality of shift gears and a technology for controlling the same.

Description of Related Art

Electric vehicles are vehicles propelled by power of an electric motor. It is necessary for such an electric vehicle to have a transmission to deliver power of a motor to driving wheels to provide sufficient levels of maximum climbing ability and ability to drive at a highest speed possible while constructing the motor to have the smallest volume as possible.

The transmission is required to have as high power transfer efficiency as possible to reduce power loss without generating a shift shock.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a driving system for an electric vehicle and a control method thereof. The driving system can reduce the volume of a motor by providing a plurality of shift gears, increase a driving distance per electric power unit due to superior power transfer efficiency, and overcome a shift shock problem.

In various aspects of the present invention, there is provided a driving system for an electric vehicle, the driving system including: a motor; a shift assembly receiving power from the motor, and providing a plurality of shift gears using a plurality of meshed external gear pairs; a clutch configured to intermittently transfer power from the motor to the shift assembly; a gear lever allowing a driver to sequentially select a plurality of assigned positions that are discontinuously disposed; a position sensor configured to detect the assigned positions to which the gear lever sequentially moves, on the basis of continuous changes in physical quantities; a clutch actuator configured to actuate the clutch; a shift actuator configured to actuate the shift assembly to change gear shifts; and a controller configured for controlling the clutch actuator, the shift actuator, and the motor to change gear shifts by receiving signals from the position sensor.

The plurality of assigned positions may be assigned to positions including a parking gear shift, a reverse gear shift, a neutral gear shift, a first gear shift, and a second gear shift, which are sequentially disposed in a straight line.

The position sensor may include a contactless magnetic flux sensor not in direct contact with the gear lever, with magnetic flux density thereof continuously changing in a response to a displacement of the gear lever.

In a case in which the gear lever moves through the assigned positions, in a sequence of the reverse gear shift, the neutral gear shift, and the first gear shift, when the gear lever moving away from the position assigned to the reverse gear shift is detected by a magnetic flux sensor signal, the controller may be configured to control the motor to gradually converge a torque thereof to 0 and controls the clutch actuator so that the clutch continuously remains engaged in the position assigned to the reverse gear shift even after the gear lever enters the position assigned to the neutral gear shift. When the gear lever enters the position assigned to the first gear shift, the controller may be configured to control the motor to gradually positively increase the torque thereof, providing a gear shift to the first gear shift.

In a case in which the gear lever moves through the assigned positions, in a sequence of the first gear shift, the neutral gear shift, and the reverse gear shift, when the gear lever moving away from the position assigned to the first gear shift is detected by a magnetic flux sensor signal, the controller may be configured to control the motor to gradually converge a torque thereof to 0 and controls the clutch actuator so that the clutch continuously remains engaged in the position assigned to the first gear shift even after the gear lever enters the position assigned to the neutral gear shift. When the gear lever enters the position assigned to the reverse gear shift, the controller may be configured to control the motor to gradually negatively increase the torque, providing a gear shift to the reverse gear shift.

In a case in which the gear lever moves from the position assigned to the first gear shift to the position assigned to the second gear shift among the plurality of assigned positions, when the gear lever arrives at a first reference position between the position assigned to the first gear shift and the position assigned to the second gear shift, the controller may be configured to control the motor to gradually converge a torque thereof to 0. When the gear lever further moves and arrives at a second reference position more adjacent to the position assigned to the second gear shift than the first reference position, the controller may sequentially perform disengaging the clutch by controlling the clutch actuator, converting the shift assembly from a first gear shift position to a second gear shift position by controlling the shift actuator, engaging the clutch by controlling the clutch actuator, and gradually increasing the torque of the motor in a positive direction thereof, providing a gear shift to the second gear shift.

In a case in which the gear lever moves from the position assigned to the second gear shift to the position assigned to the first gear shift among the plurality of assigned positions, when the gear lever arrives at a third reference position between the position assigned to the second gear shift and the position assigned to the first gear shift, the controller may be configured to control the motor to gradually converge a torque thereof to 0. When the gear lever further moves and arrives at a fourth reference position more adjacent to the position assigned to the first gear shift than the third reference position, the controller may sequentially perform disengaging the clutch by controlling the clutch actuator, converting the shift assembly from the second gear shift position to the first gear shift position by controlling the shift actuator, engaging the clutch by controlling the clutch actuator, and gradually increasing the torque of the motor in the positive direction thereof, providing a gear shift to the first gear shift.

In various aspects of the present invention, there is provided a method of controlling the driving system having the above-described configuration. The method may include: in a case in which the gear lever moves through the assigned positions, in a sequence of the reverse gear shift, the neutral gear shift, and the first gear shift, when the gear lever moving away from the position assigned to the reverse gear shift is detected by a magnetic flux sensor signal, controlling the motor to gradually converge a torque thereof to 0; controlling the clutch actuator so that the clutch continuously remains engaged in the position assigned to the reverse gear shift even after the gear lever enters the position assigned to the neutral gear shift; and when the gear lever enters the position assigned to the first gear shift, controlling the motor to gradually positively increase the torque thereof, providing a gear shift to the first gear shift.

In a case in which the gear lever moves through the assigned positions, in a sequence of the first gear shift, the neutral gear shift, and the reverse gear shift, the method may provide a gear shift to the reverse gear shift by including: when the gear lever moving away from the position assigned to the first gear shift is detected by a magnetic flux sensor signal, controlling the motor to gradually converge the torque to 0; controlling the clutch actuator so that the clutch continuously remains engaged in the position assigned to the first gear shift even after the gear lever enters the position assigned to the neutral gear shift; and when the gear lever enters the position assigned to the reverse gear shift, controlling the motor to gradually negatively increase the torque.

In a case in which the gear lever moves from the position assigned to the first gear shift to the position assigned to the second gear shift among the plurality of assigned positions, the method may provide a gear shift to the second gear shift by sequentially including: when the gear lever arrives at a first reference position between the position assigned to the first gear shift and the position assigned to the second gear shift, controlling the motor to gradually converge the torque to 0; when the gear lever further moves and arrives at a second reference position more adjacent to the position assigned to the second gear shift than the first reference position, disengaging the clutch by controlling the clutch actuator; converting the shift assembly from a first gear shift position to a second gear shift position by controlling the shift actuator; engaging the clutch by controlling the clutch actuator; and controlling the motor to gradually increase the torque in the positive direction thereof.

In a case in which the gear lever moves from the position assigned to the second gear shift to the position assigned to the first gear shift among the plurality of assigned positions, the method may provide a gear shift to the first gear shift by sequentially performing: when the gear lever arrives at a third reference position between the position assigned to the second gear shift and the position assigned to the first gear shift, controlling the motor to gradually converge the torque to 0; when the gear lever further moves and arrives at a fourth reference position more adjacent to the position assigned to the first gear shift than the third reference position, disengaging the clutch by controlling the clutch actuator; converting the shift assembly from the second gear shift position to the first gear shift position by controlling the shift actuator; engaging the clutch by controlling the clutch actuator; and controlling the motor to gradually increase the torque in the positive direction thereof.

In a case in which the shift assembly may include a second or higher gear and a vehicle speed is determined to be equal to or greater than a predetermined first reference vehicle speed, even if the gear lever has arrived at the position assigned to the first gear shift, the controller may prevent a gear shift to the first gear shift by maintaining the shift actuator and the clutch actuator in current positions thereof.

In a case in which the shift assembly may include a first or higher gear and a vehicle speed is determined to be equal to or greater than a second reference vehicle speed, even if the gear lever 16 has moved to the position assigned to the reverse gear shift, the controller may prevent a gear shift to the reverse gear shift by maintaining the shift actuator and the clutch actuator in current positions thereof.

When it is determined that the vehicle is starting or driving uphill on the basis of received road inclination information, even if the gear lever has moved from the position assigned to the first gear shift to an assigned position in which a second or higher gear is selected, the controller may prevent a gear shift by maintaining the shift actuator and the clutch actuator in current positions thereof.

When an accelerator pedal is manipulated simultaneously with the gear lever moving from the position assigned to the neutral gear shift to the position assigned to the first gear shift, the controller may be configured to control the motor to increase the torque depending on a displacement of the accelerator pedal after engagement of the clutch by the clutch actuator is completed.

When the gear lever is in the position assigned to the reverse gear shift or the position assigned to the first gear shift and the driver is not stepping on an accelerator pedal, the motor may generate creep torque necessary for a creep travel of a vehicle.

The present invention can reduce the volume of a motor by providing a plurality of shift gears and increase a driving distance per electric power unit due to superior power transfer efficiency.

Furthermore, it is possible to overcome the shift shock problem that a driver feels while using a simple configuration, thereby providing an economical and practical driving system for an electric vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
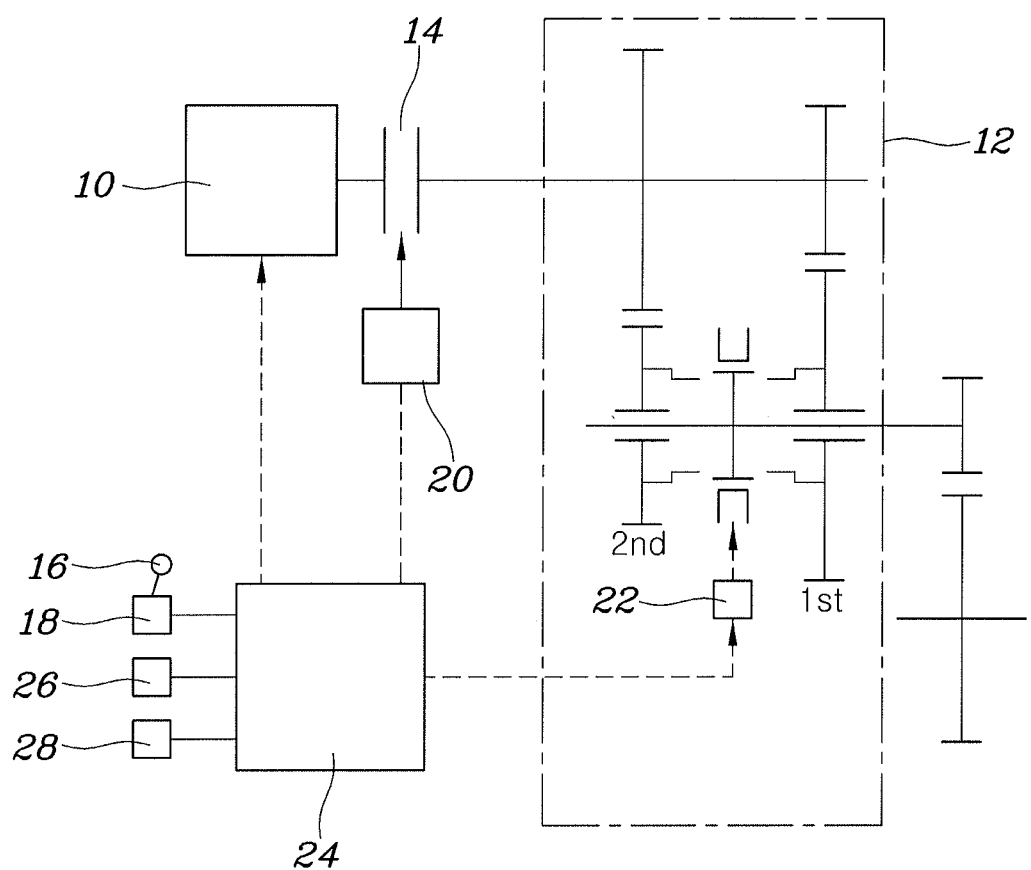
FIG. 1 is a conceptual view exemplarily illustrating an exemplary embodiment of a driving system for an electric vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 2:
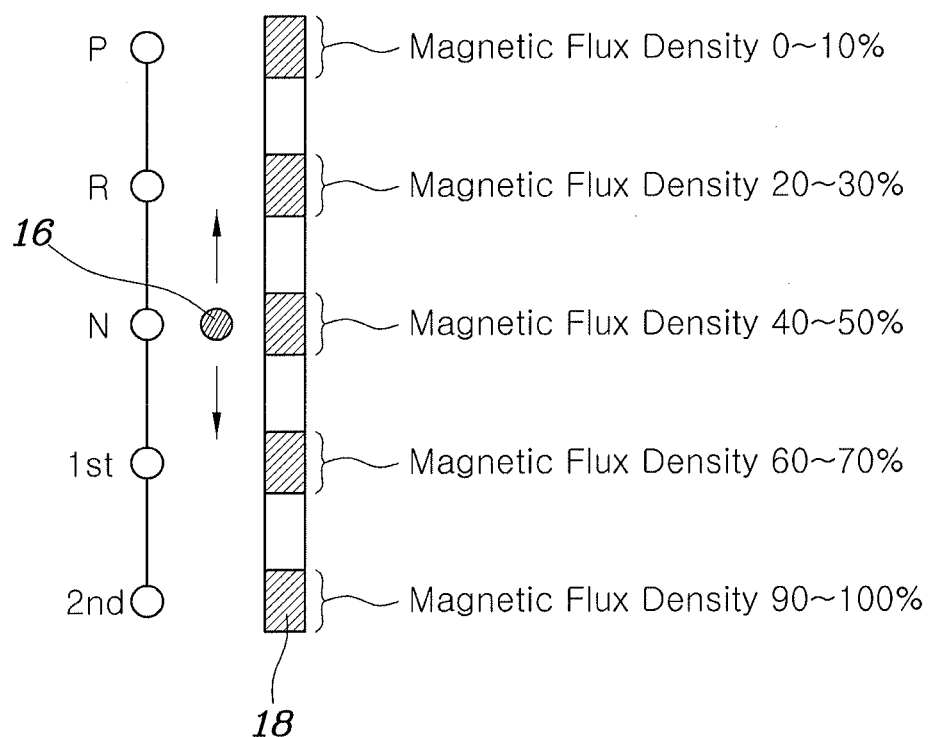
FIG. 2 is a conceptual view exemplarily illustrating an exemplary embodiment of the position sensor illustrated in FIG. 1.

Referring to FIG. 1 and FIG. 2, an exemplary embodiment of a driving system for an electric vehicle according to an exemplary embodiment of the present invention may include a motor 10; a shift assembly 12 receiving power from the motor 10, and providing a plurality of shift gears using a plurality of meshed external gear pairs; a clutch 14 configured to intermittently transfer power from the motor 10 to the shift assembly 12; a gear lever 16 allowing a driver to sequentially select a plurality of assigned positions that are discontinuously disposed; a position sensor 18 configured to detect the assigned positions to which the gear lever 16 sequentially moves, on the basis of continuous changes in physical quantities; a clutch actuator 20 configured to actuate the clutch 14; a shift actuator 22 configured to actuate the shift assembly 12 to change gear shifts; and a controller 24 controlling the clutch actuator 20, the shift actuator 22, and the motor 10 to change gear shifts by receiving signals from the position sensor 18.

For reference, the controller 24 is configured to receive a displacement of an accelerator pedal from an accelerator sensor 26 and receive a vehicle speed from a vehicle speed sensor 28.

Although the shift assembly 12 is illustrated as having two gears, i.e., a first gear and a second gear, in FIG. 1, the shift assembly 12 may have additional gears using additional external gear pairs and a synchronization device. A separate reverse gear shift is not provided. Reverse driving may be realized by reversely rotating the motor 10 in a first gear shift position.

To provide shift gears as described above, the shift assembly 12 is provided as a synchronous gear mechanism including a plurality of external gear pairs, and selects an external gear pair by which power is transferred, among the plurality of external gear pairs, using a synchronizer to change gear shifts.

The shift assembly 12 has high power transfer efficiency like a shift mechanism of a typical manual transmission of the related art. Furthermore, the shift assembly 12 provides a second or higher gear as described above, and provides maximum climbing ability and ability to drive at a highest speed at intended levels while reducing the volume of the motor 10. Accordingly, it is possible to increase the driving distance of an electric vehicle per electric power unit.

Furthermore, in the driving system according to an exemplary embodiment of the present invention, the controller 24 controls the clutch actuator 20 to engage and disengage the clutch, instead of a clutch pedal being additionally provided.

Furthermore, the controller 24 controls a gear shift operation in a response to the gear lever 16 being manipulated by the driver, unlike an automated transmission of the related art.

That is, when a displacement of the gear lever 16, in a response to the gear lever 16 being manipulated by the driver, is input to the gear lever 16 via the position sensor 18, the controller 24 activates the gear shift operation of the shift assembly 12 by controlling the shift actuator 22, as requested by the driver.

In other words, the automated transmission of the related art automatically performs a gear shift using a shifting map on the basis of a vehicle speed and a displacement of the accelerator pedal manipulated by the driver. In contrast, according to an exemplary embodiment of the present invention, a gear shift is performed to the first gear shift or the second gear shift, in a response to the gear lever 16 being manipulated by the driver.

Accordingly, a gear shift is performed only when the driver intends to change gear shifts, and a situation in which the driver feels unpleasant due to a shift shock, produced by a gear shift occurring at an unexpected moment as in an automated manual transmission (AMT) of the related art, does not occur.

That is, when the gear shift is performed, the driver has a sensation of power disconnection at the same level as in the case of the AMT of the related art, due to disengagement of the clutch by the shift assembly 12. However, as drivers using a manual transmission take the sensation of power disconnection for granted instead of regarding the sensation of power disconnection as a significant problem, drivers of vehicles provided with the driving system according to an exemplary embodiment of the present invention will not feel unpleasant of the sensation of power disconnection generated when gears are changed according to the intention of the driver.

Furthermore, in an electric vehicle, the first gear shift can cover the entire range of city driving or low-speed driving, from a parked position to a speed of 90 kph~100 kph, and the second gear shift is necessary only for high-speed driving exceeding 100 kph. Accordingly, the present invention has advantageous ability of significantly improving the fuel efficiency, noise, vibration, and harshness (NVH) performance, driving performance, and the like of the vehicle while having relatively insignificant inconvenience which may be caused by manual gear shifting.

The driver can select a plurality of assigned positions by manipulating the gear lever 16. The plurality of assigned positions is assigned to gears including a parking gear shift P, a reverse gear shift R, a neutral gear shift N, a first gear shift 1ST, and a second gear shift 2ND, which are sequentially disposed in a straight line, as illustrated in FIG. 2.

The position sensor 18 is implemented as a contactless magnetic flux sensor. The contactless magnetic flux sensor does not directly contact the gear lever 16, with magnetic flux density thereof continuously changing in a response to a displacement of the gear lever 16. As illustrated in FIG. 2, in a case in which the position sensor 18 can detect magnetic flux density ranging from 0% to 100%, magnetic flux density ranges of 0% to 10%, 20% to 30%, 40% to 50%, 60% to 70%, and 90% to 100% may be sequentially set to the parking gear shift P, the reverse gear shift R, the neutral gear shift N, the first gear shift 1ST, and the second gear shift 2ND.

Figure 3:
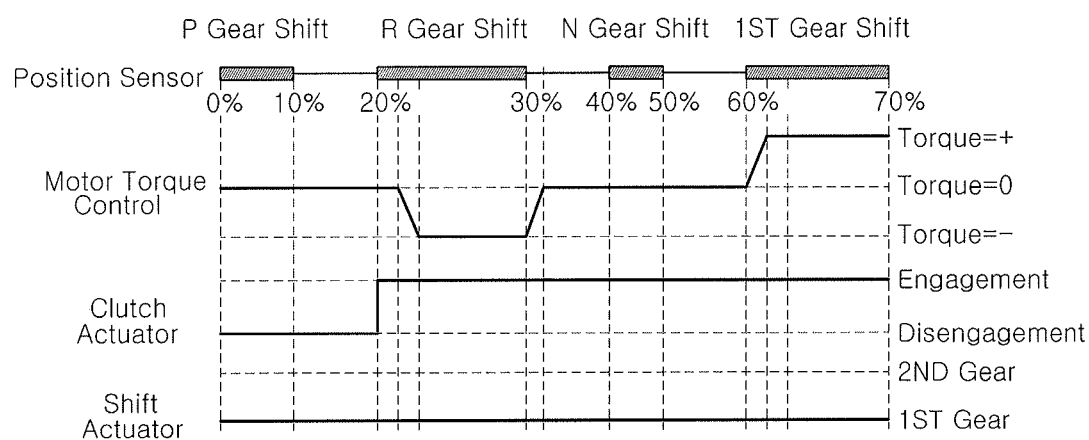
FIG. 3 and FIG. 4 are graphs illustrating a control method of the driving system for an electric vehicle according to an exemplary embodiment of the present invention.

Referring to FIG. 3, in a case in which the gear lever 16 moves through the assigned positions, in the sequence of the reverse gear shift, the neutral gear shift, and the first gear shift, when the gear lever 16 moving away from the position assigned to the reverse gear shift is detected by a magnetic flux sensor signal, the torque of the motor 10 is gradually converged to 0, and the clutch actuator 20 is controlled so that the clutch continuously remains engaged in the position assigned to the reverse gear shift even after the gear lever 16 enters the position assigned to the neutral gear shift. When the gear lever 16 enters the position assigned to the first gear shift, the torque of the motor 10 is gradually increased in the positive direction thereof, so that a gear shift to the first gear shift is completed.

In contrast, in a case in which the gear lever 16 moves through the assigned positions, in the sequence of the first gear shift, the neutral gear shift, and the reverse gear shift, when the gear lever 16 moving away from the position assigned to the first gear shift is detected by a magnetic flux sensor signal, the torque of the motor 10 is gradually converged to 0, and the clutch actuator 20 is controlled so that the clutch continuously remains engaged in the position assigned to the first gear shift even after the gear lever 16 enters the position assigned to the neutral gear shift. When the gear lever 16 enters the position assigned to the reverse gear shift, the torque of the motor 10 is gradually increased in the negative direction thereof, so that a gear shift to the reverse gear shift is provided.

That is, when the gear lever 16 passes through the position assigned to the neutral gear shift while moving away from the position assigned to the reverse gear shift or the first gear shift, the controller 24 maintains the clutch in the engaged position instead of disengaging the clutch, so that a future operation of disengaging and then engaging the clutch to provide the first gear shift or the reverse gear shift can be omitted. Instead, the controller 24 maintains the torque of the motor 10 at 0 to provide the neutral position. Accordingly, it is possible to prevent power loss, occurrence of shocks or vibrations, shift delay, which would otherwise be caused by engagement and disengagement of the clutch.

For reference, in FIG. 3, the torque of the motor 10 is based on a case in which the accelerator pedal is manipulated by the driver. That is, although the torque of the motor 10 is generated in the negative direction to provide the rear gear in FIG. 3, the toque of the motor 10 is not unconditionally generated in the negative direction when the gear lever 16 is in the position assigned to the reverse gear shift. When a displacement of the accelerator pedal corresponding to the negative torque of the motor 10 is manipulated, the torque of the motor 10 corresponding thereto is generated.

Furthermore, in a case in which the gear lever 16 is in the position assigned to the reverse gear shift or the first gear shift, when the driver is not stepping on the accelerator pedal, the motor 10 may be caused to generate creep torque in a level simulating a creep travel of a vehicle provided with a torque converter. In a case in which the gear lever 16 is in the position assigned to the neutral gear shift, even if the driver manipulates the accelerator pedal, the controller 24 will maintain the neutral position by maintaining the torque of the motor 10 at 0.

Figure 4:
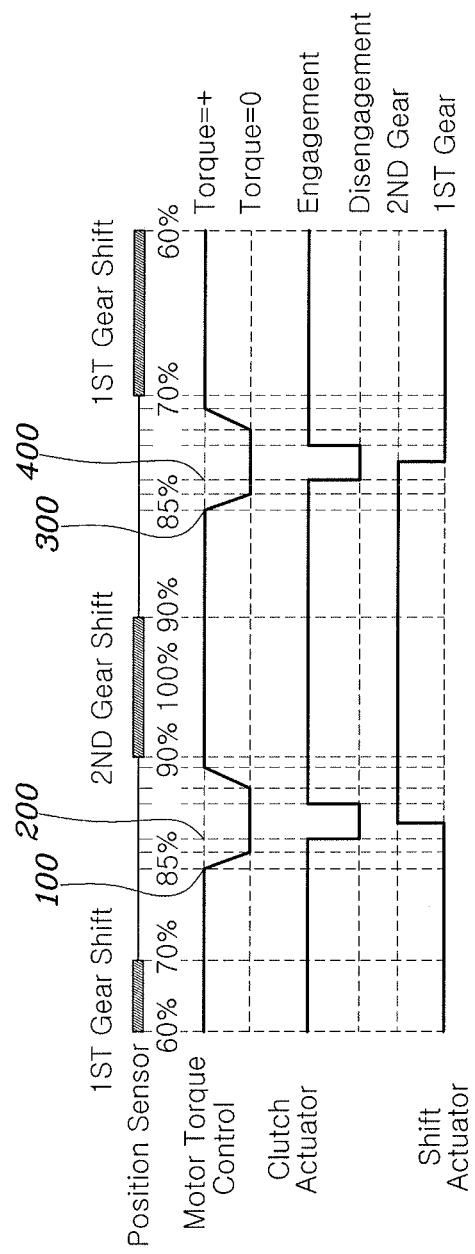

Referring to FIG. 4, in a case in which the gear lever 16 moves from the position assigned to the first gear shift to the position assigned to the second gear shift among the above-described assigned positions, when the gear lever 16 arrives at a first reference position 100 between the position assigned to the first gear shift and the position assigned to the second gear shift, the controller 24 gradually converges the torque of the motor 10 to 0. When the gear lever 16 further moves and arrives at a second reference position 200 more adjacent to the position assigned to the second gear shift than the first reference position 100, the controller 24 sequentially performs operations of disengaging the clutch by controlling the clutch actuator 20, converting the shift assembly 12 from a first gear shift position to a second gear shift position by controlling the shift actuator 22, engaging the clutch by controlling the clutch actuator 20, and gradually increasing the torque of the motor 10 in the positive direction thereof, completing a gear shift to the second gear shift.

Here, the first reference position 100 and the second reference position 200 may be determined at levels by which an intention of the driver to change gear shifts may be recognized. For example, the first reference position 100 may be set to be the middle between the position assigned to the first gear shift and the position assigned to the second gear shift, while the second reference position 200 may be set to be the middle between the first reference position 100 and the position assigned to the second gear shift.

Furthermore, in a case in which the gear lever 16 moves from the position assigned to the second gear shift to the position assigned to the first gear shift among the above-described assigned positions, when the gear lever 16 arrives at a third reference position 300 between the position assigned to the second gear shift and the position assigned to the first gear shift, the controller 24 gradually converges the torque of the motor 10 to 0. When the gear lever 16 further moves and arrives at a fourth reference position 400 more adjacent to the position assigned to the first gear shift than the third reference position 300, the controller 24 sequentially performs operations of disengaging the clutch by controlling the clutch actuator 20, converting the shift assembly 12 from the second gear shift position to the first gear shift position by controlling the shift actuator 22, engaging the clutch by controlling the clutch actuator 20, and gradually increasing the torque of the motor 10 in the positive direction thereof, completing a gear shift to the first gear shift.

Here, the third reference position 300 and the fourth reference position 400 may be determined at levels by which an intention of the driver to change gear shifts may be recognized. For example, the third reference position 300 may be set to be the middle between the position assigned to the second gear shift and the position assigned to the first gear shift, while the fourth reference position 400 may be set to be the middle between the third reference position 300 and the position assigned to the first gear shift.

That is, in a case in which the driver changes gears from the first gear shift to the second gear shift or, vice versa, from the second gear shift to the first gear shift, even before the gear lever 16 arrives at the position assigned to the intended gear, when the position of the gear lever 16 passes through the first reference position 100 and the second reference position 200 or through the third reference position 300 and the fourth reference position 400, procedures necessary for gear shift are sequentially performed, completing gear shift. Accordingly, the present process can perform gear shift more rapidly than a case of completing gear shift after determining arrival of the gear lever 16 to the position assigned to an intended gear.

In a case in which the shift assembly 12 includes a second or higher gear shift and the speed of the vehicle is determined to be equal to or greater than a predetermined first reference vehicle speed, even if the gear lever 16 has arrived at the position assigned to the first gear shift, the controller 24 prevents a gear shift to the first gear shift by maintaining the shift actuator 22 and the clutch actuator 20 in current positions thereof.

This is directed to prevent the number of revolutions of the motor 10 from rapidly increasing and the vehicle from being unstable (e.g., the steering of the vehicle from being uncontrollable) when a gear shift to the first gear shift is performed during high-speed driving of the vehicle. Here, the first reference vehicle speed is set to be, for example, 130 km/h. In vehicle speeds equal to or greater than the first reference vehicle speed, even if the driver moves the gear lever 16 to the position assigned to the first gear shift, the shift actuator 22 and clutch actuator 20 are maintained in current positions, so that a current gear position may be maintained. Accordingly, the present can prevent a sudden gear shift to the first gear shift.

While the gear shift to the first gear shift is being prevented, the controller 24 may warn or inform the driver of the present situation using an audiovisual device.

Furthermore, when the shift assembly 12 includes a first or higher gear shift and the speed of the vehicle is determined to be equal to or greater than a second reference vehicle speed, even if the gear lever 16 has moved to the position assigned to the reverse gear shift, the controller 24 prevents a gear shift to the reverse gear shift by maintaining the shift actuator 22 and the clutch actuator 20 in current positions thereof.

Here, the second reference vehicle speed is selected in consideration of a level in which the vehicle may be unstable when a sudden gear shift to the reverse gear shift is performed. For example, the second reference vehicle speed may be set to be, for example, 80 km/h, to be appropriate to the purpose of the present invention.

When the controller 24 determines that the vehicle is starting or driving uphill by receiving road inclination information, even if the gear lever 16 has moved from the position assigned to the first gear shift to an assigned position in which a second or higher gear shift is selected, the controller 24 prevents a gear shift by maintaining the shift actuator 22 and the clutch actuator 20 in current positions thereof.

This is directed to providing a sufficient amount of propulsion to the vehicle when starting or driving uphill. In a case in which it is determined to be difficult to provide a sufficient amount of propulsion to the vehicle starting or driving uphill on a road having an inclination equal to or greater than a predetermined inclination, even if the driver selects a second or higher gear shift, the controller 24 controls the shift actuator 22 and the clutch actuator 20 to maintain the first gear shift position, so that a suitable amount of propulsion may be provided to the vehicle even in cases of inexperienced driving or an accidental gear shift.

Accordingly, the predetermined inclination may be properly set by a plurality of experiments or analyses, such that, when a shift change to the second gear shift is performed at an inclination equal to or greater than the predetermined inclination, the vehicle may be provided with an insufficient amount of propulsion.

When the accelerator pedal is manipulated simultaneously with the gear lever 16 moving from the position assigned to the neutral gear shift to the position assigned to the first gear shift, the controller 24 controls the motor 10 to increase the torque thereof depending on the displacement of the accelerator pedal after clutch engagement by the clutch actuator 20 is completed.

In a case in which the driver deeply steps on the accelerator pedal while changing the gear lever 16 from the neutral position to the first gear shift position, when the torque of the motor 10 is increased following the displacement of the accelerator pedal before engagement of the clutch, the clutch may be damaged due to excessive friction. Accordingly, to protect the clutch from such a problem, the torque of the motor 10 is increased depending on the displacement of the accelerator only after the engagement of the clutch is completed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driving system for a vehicle, the driving system comprising:
   a motor;
   a shift assembly engaged to the motor and receiving power from the motor, wherein the shift assembly includes a plurality of shift gears using a plurality of meshed external gear pairs;
   a clutch mounted between the motor and the shift assembly and configured to selectively transfer the power from the motor to the shift assembly;
   a gear lever allowing a driver to sequentially select a plurality of assigned positions that are discontinuously disposed;
   a position sensor configured to detect the assigned positions to which the gear lever sequentially moves, on a basis of continuous changes in physical quantities of the position sensor according to the plurality of assigned positions;
   a clutch actuator configured to actuate the clutch;
   a shift actuator configured to actuate the shift assembly to change gear shifts; and
   a controller connected to the clutch actuator, the shift actuator, and the motor and configured for controlling the clutch actuator, the shift actuator, and the motor to change the gear shifts by receiving signals from the position sensor,
   wherein the position sensor includes a contactless magnetic flux sensor configured not to be in direct contact with the gear lever, wherein magnetic flux density of the contactless magnetic flux sensor continuously changes in a response to a displacement of the gear lever.

2. The driving system of claim 1, wherein the plurality of assigned positions is assigned to positions of the gear shifts including a parking gear shift, a reverse gear shift, a neutral gear shift, a first gear shift, and a second gear shift, which are sequentially disposed in a straight line.

3. The driving system of claim 2,
wherein, when the gear lever moves through the assigned positions, in a sequence of the reverse gear shift, the neutral gear shift, and the first gear shift and when the gear lever moving away from the position assigned to the reverse gear shift is detected by a magnetic flux sensor signal, the controller is configured to control the motor to converge a torque of the motor to 0 and to control the clutch actuator so that the clutch continuously remains engaged in the position assigned to the reverse gear shift even after the gear lever enters the position assigned to the neutral gear shift, and
wherein when the gear lever enters the position assigned to the first gear shift, the controller is configured to control the motor to positively increase the torque thereof, providing a gear shift to the first gear shift.

4. The driving system of claim 2,
wherein, when the gear lever moves through the assigned positions, in a sequence of the first gear shift, the neutral gear shift, and the reverse gear shift and when the gear lever moving away from the position assigned to the first gear shift is detected by a magnetic flux sensor signal, the controller is configured to control the motor to converge a torque of the motor to 0 and to control the clutch actuator so that the clutch continuously remains engaged in the position assigned to the first gear shift even after the gear lever enters the position assigned to the neutral gear shift, and
wherein, when the gear lever enters the position assigned to the reverse gear shift, the controller is configured to control the motor to negatively increase the torque, providing a gear shift to the reverse gear shift.

5. The driving system of claim 2,
wherein when the gear lever moves from the position assigned to the first gear shift to the position assigned to the second gear shift among the plurality of assigned positions and when the gear lever arrives at a first reference position between the position assigned to the first gear shift and the position assigned to the second gear shift, the controller is configured to control the motor to converge a torque of the motor to 0, and
wherein when the gear lever further moves and arrives at a second reference position more adjacent to the position assigned to the second gear shift than the first reference position, the controller is configured to sequentially perform disengaging the clutch by controlling the clutch actuator, converting the shift assembly from the first gear shift to the second gear shift by controlling the shift actuator, engaging the clutch by controlling the clutch actuator, and positively increasing the torque of the motor, providing a gear shift to the second gear shift.

6. The driving system of claim 2,
wherein when the gear lever moves from the position assigned to the second gear shift to the position assigned to the first gear shift among the plurality of assigned positions and when the gear lever arrives at a third reference position between the position assigned to the second gear shift and the position assigned to the first gear shift, the controller is configured to control the motor to converge a torque of the motor to 0, and
wherein when the gear lever further moves and arrives at a fourth reference position more adjacent to the position assigned to the first gear shift than the third reference position, the controller is configured to sequentially perform disengaging the clutch by controlling the clutch actuator, converting the shift assembly from the second gear shift to the first gear shift by controlling the shift actuator, engaging the clutch by controlling the clutch actuator, and positively increasing the torque of the motor, providing a gear shift to the first gear shift.

7. A method of controlling the driving system as claimed in claim 2, the method including: in a case in which the gear lever moves through the plurality of assigned positions, in a sequence of the reverse gear shift, the neutral gear shift, and the first gear shift,
when the gear lever moving away from the position assigned to the reverse gear shift is detected by a magnetic flux sensor signal, controlling, by the controller, the motor to converge the torque of the motor to 0;
controlling, by the controller, the clutch actuator so that the clutch continuously remains engaged in the position assigned to the reverse gear shift even after the gear lever enters the position assigned to the neutral gear shift; and
when the gear lever enters the position assigned to the first gear shift, controlling, by the controller, the motor to positively increase the torque of the motor, providing a gear shift to the first gear shift.

8. The method of claim 7, wherein in a case in which the gear lever moves through the assigned positions, in a sequence of the first gear shift, the neutral gear shift, and the reverse gear shift, the method further provides a gear shift to the reverse gear shift by:
when the gear lever moving away from the position assigned to the first gear shift is detected by a magnetic flux sensor signal, controlling, by the controller, the motor to converge the torque to 0;
controlling, by the controller, the clutch actuator so that the clutch continuously remains engaged in the position assigned to the first gear shift even after the gear lever enters the position assigned to the neutral gear shift; and
when the gear lever enters the position assigned to the reverse gear shift, controlling, by the controller, the motor to negatively increase the torque.

9. The method of claim 7, wherein in a case in which the gear lever moves from the position assigned to the first gear shift to the position assigned to the second gear shift among the plurality of assigned positions, the method further provides a gear shift to the second gear shift by sequentially including:
when the gear lever arrives at a first reference position between the position assigned to the first gear shift and the position assigned to the second gear shift, controlling, by the controller, the motor to converge the torque to 0;
when the gear lever further moves and arrives at a second reference position more adjacent to the position assigned to the second gear shift than the first reference position, disengaging, by the controller, the clutch by controlling the clutch actuator;
converting, by the controller, the shift assembly from the first gear shift to the second gear shift by controlling the shift actuator;
engaging, by the controller, the clutch by controlling the clutch actuator; and
controlling, by the controller, the motor to positively increase the torque.

10. The method of claim 7, wherein, in a case in which the gear lever moves from the position assigned to the second gear shift to the position assigned to the first gear shift among the plurality of assigned positions, the method further provides a gear shift to the first gear shift by sequentially performing:

when the gear lever arrives at a third reference position between the position assigned to the second gear shift and the position assigned to the first gear shift, controlling, by the controller, the motor to converge the torque of the motor to 0;

when the gear lever further moves and arrives at a fourth reference position more adjacent to the position assigned to the first gear shift than the third reference position, disengaging, by the controller, the clutch by controlling the clutch actuator;

converting, by the controller, the shift assembly from the second gear shift to the first gear shift by controlling the shift actuator;

engaging, by the controller, the clutch by controlling the clutch actuator; and controlling, by the controller, the motor to positively increase the torque.

11. The method of claim 7, wherein, when the gear shifts of the shift assembly includes the second gear shift or a gear shift higher than the second gear shift and a vehicle speed is determined to be equal to or greater than a predetermined first reference vehicle speed, even when the gear lever has arrived at the position assigned to the first gear shift, the controller is configured to prevent a gear shift to the first gear shift by maintaining the shift actuator and the clutch actuator in current positions thereof.

12. The method of claim 7, wherein, in a case in which the gear shifts of the shift assembly includes the first gear shift or a gear shaft higher than the first gear shift and a vehicle speed is determined to be equal to or greater than a second reference vehicle speed, even when the gear lever has moved to the position assigned to the reverse gear shift, the controller is configured to prevent a gear shift to the reverse gear shift by maintaining the shift actuator and the clutch actuator in current positions thereof.

13. The method of claim 7, wherein, when it is determined by the controller that the vehicle is starting or driving uphill on a basis of received road inclination information, even when the gear lever has moved from the position assigned to the first gear shift to an position in which the second gear shift is selected or a position in which a gear shift higher than the second gear shift is selected, the controller is configured to prevent a gear shift by maintaining the shift actuator and the clutch actuator in current positions thereof.

14. The method of claim 7, wherein, when an accelerator pedal is manipulated with the gear lever moving from the position assigned to the neutral gear shift to the position assigned to the first gear shift, the controller is configured to control the motor to increase the torque of the motor depending on a displacement of the accelerator pedal after engagement of the clutch by the clutch actuator is completed.

15. The method of claim 7, wherein, when the gear lever is in the position assigned to the reverse gear shift or the position assigned to the first gear shift and the driver does not step on an accelerator pedal, the controller is configured to control the motor to generate creep torque required for a creep travel of the vehicle.

* * * * *